(12) United States Patent
Goldstein

(10) Patent No.: US 6,742,318 B2
(45) Date of Patent: Jun. 1, 2004

(54) METHOD AND APPARATUS FOR FORMING A LAP SEAL USING A FOLDED ROLL OF FILM

(76) Inventor: Leonard Goldstein, 4233 NW. 64th Ave., Coral Springs, FL (US) 33067

(*) Notice: Subject to any disclaimer, the term of this patent is extended or adjusted under 35 U.S.C. 154(b) by 217 days.

(21) Appl. No.: 10/014,981

(22) Filed: Dec. 11, 2001

(65) Prior Publication Data
US 2003/0106632 A1 Jun. 12, 2003

(51) Int. Cl.[7] .................. B32B 3/10; B32B 31/08

(52) U.S. Cl. .................. 53/427; 53/442; 156/227; 156/252; 428/57; 428/124; 428/131; 428/137; 428/906

(58) Field of Search .................. 428/57, 124, 131, 428/137, 906; 242/160.4, 160.3; 156/252, 227; 53/427, 442

(56) References Cited

U.S. PATENT DOCUMENTS

| | | | |
|---|---|---|---|
| 4,287,011 A | * | 9/1981 | Derbyshire .................. 156/85 |
| 4,947,605 A | | 8/1990 | Ramsey |
| 5,001,884 A | | 3/1991 | Hanagata |
| 6,027,596 A | | 2/2000 | DeFriese et al. |
| 6,534,137 B1 | * | 3/2003 | Vadhar .................. 428/34.9 |

OTHER PUBLICATIONS

Definition of "spool"; Dec. 1972, Webster's New World Dictionary.*
Various sealer product data from Shanklin Corporation, Oct. 2001.

* cited by examiner

Primary Examiner—Alexander S. Thomas
(74) Attorney, Agent, or Firm—Akerman Senterfitt

(57) ABSTRACT

Folded film (10) used to create a lap seal using an L sealer (50) includes a first film (12) folded substantially in a form of a "J" and a second film (14) overlapping at least a portion (16) of the first film. The first film and the second film are coupled together (19) in at least a portion of an overlapping area.

17 Claims, 5 Drawing Sheets

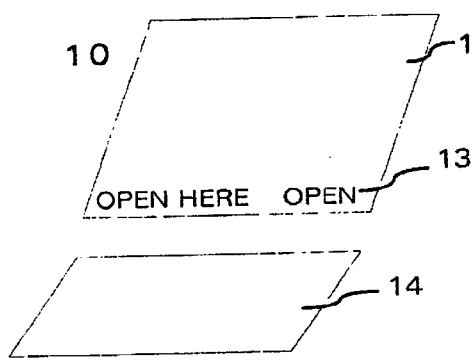
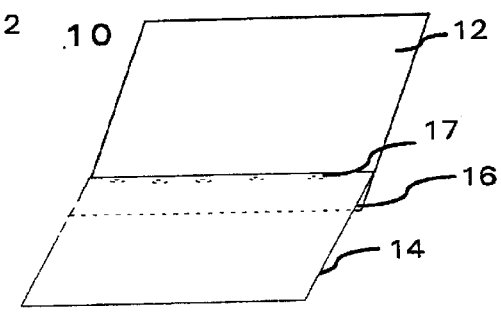
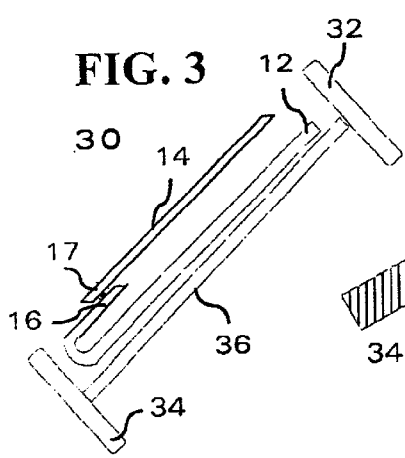
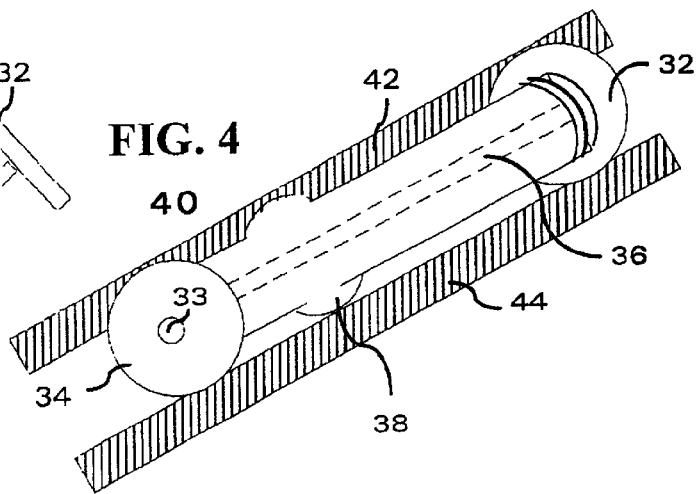
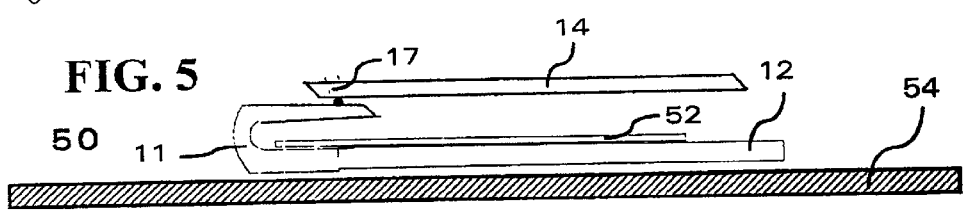
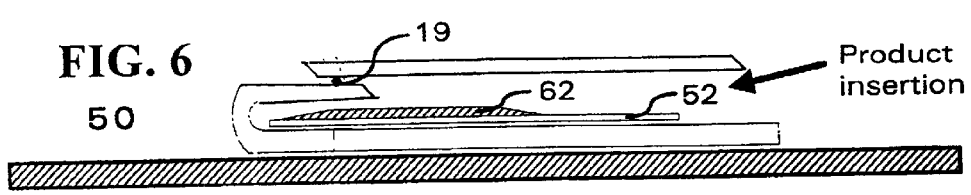

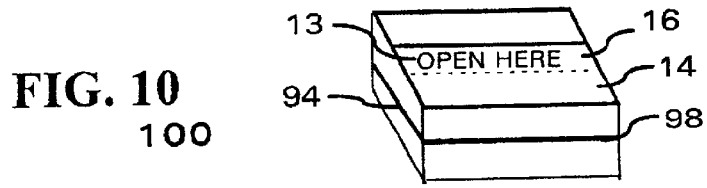
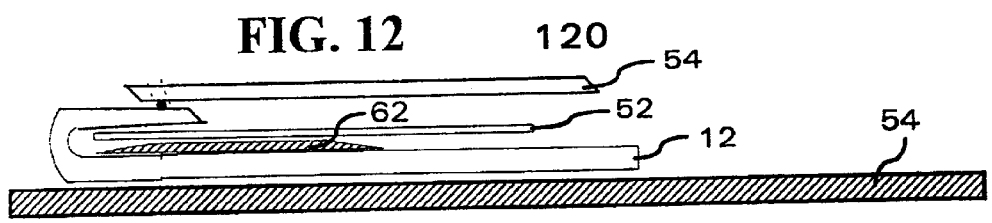
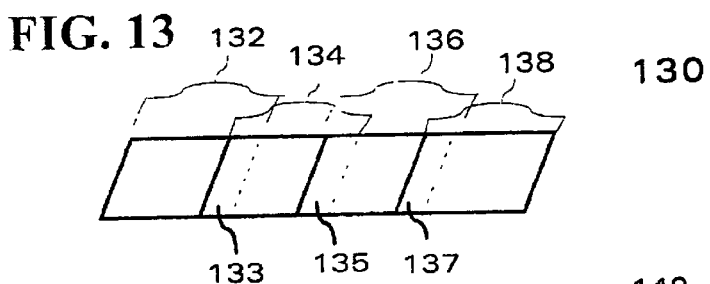
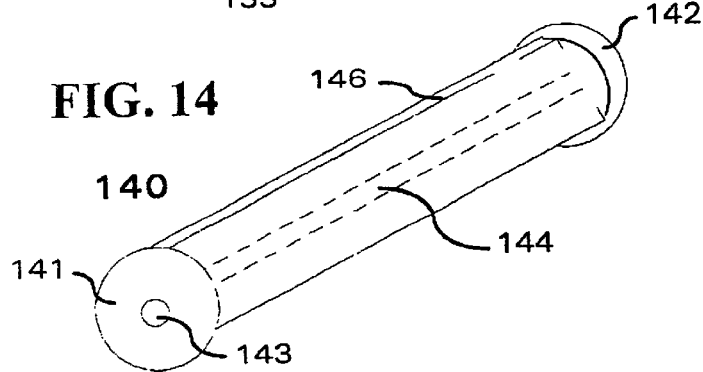
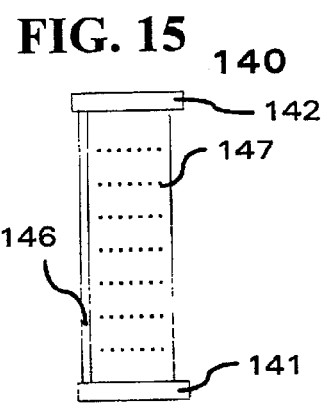

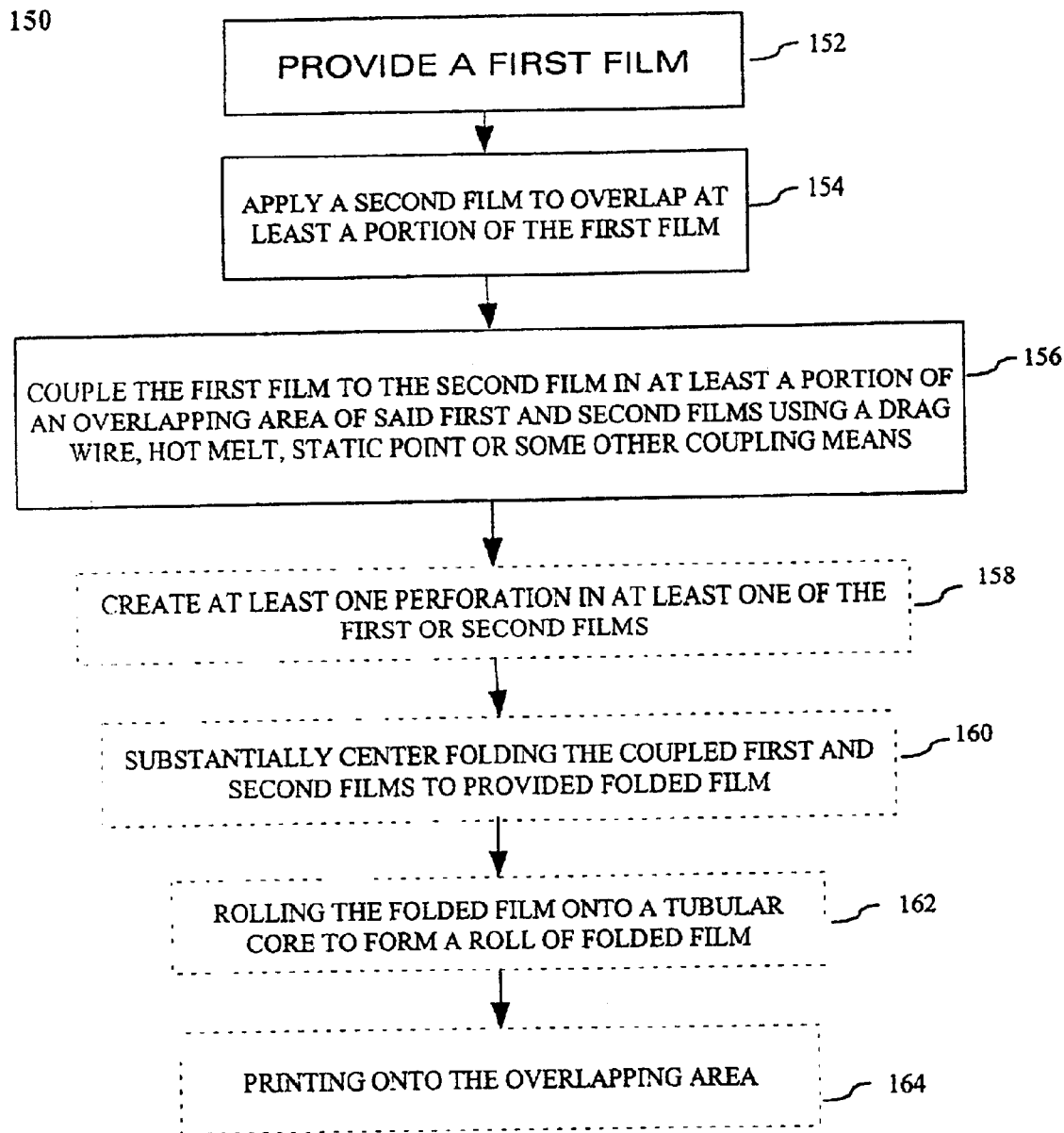

DISPENSE PRE-FOLDED FILM HAVING A PRE-EXISTING LAP SEAL ON THE PRE-FOLDED FILM ONTO A SEPARATOR TABLE OF AN L-SEALER MACHINE AND THE PRE-FOLDED FILM MAY OPTIONALLY BE PRE-PERFORATED — 170

↓

PERFORATE THE PRE-FOLDED FILM AS THE PRE-FOLDED FILM IS BEING DISPENSED — 172

↓

INSERT AN ITEM BETWEEN THE SEPARATOR TABLE AND A FIRST SIDE OF THE PRE-FOLDED FILM — 174

↓

SEAL THE ITEM ON AT LEAST TWO SIDES USING A SUBSTANTIALLY L-SHAPED HEATED BAR FORMING A SUBSTANTIALLY WRAPPED ITEM — 176

↓

HEAT THE SUBSTANTIALLY WRAPPED ITEM TO REMOVE A SUBSTANTIAL PORTION OF AIR BETWEEN THE PRE-FOLDED FILM AND THE ITEM — 178

METHOD AND APPARATUS FOR FORMING A LAP SEAL USING A FOLDED ROLL OF FILM

FIELD OF THE INVENTION

This invention relates generally to film used to wrap around products, and more particularly to a method and system of utilizing a roll of film having an overlap or lap seal.

BACKGROUND OF THE INVENTION

Shrink film or film or thin sheeting used for wrapping a myriad of products in an unlimited number of configurations typically comes in two forms on a roll. The first form of film is known as flat sheeting that is typically used on expensive form, fill, and seal (FFS) machines that have high output capability. The resultant seal from an FFS machine is a lap seal that is easy opening. The second form of film comes on a center folded roll of film that is typically used on less expensive "L" sealer machines with less output capability than the FFS machines. The resultant seal from an L sealer machine is a "trim" seal.

An industrial FFS machine costing approximately $50,000 could wrap approximately 80 to 100 products per minute. An FFS machine will typically dispense flat sheeting towards a forming device which folds the film on to itself with a slight overlap that is then typically sealed in a first direction utilizing a drag wire, hot melt, static points or some other sealing means to create a centered overlap seal. The item being wrapped is then inserted into the folded lap sealed "envelope" and then finally sealed in a second direction (perpendicular to the overlap seal) typically using a sealer in the form of a heated bar that serves to both side seal the bottom side of the wrapping for the first item and side seal the top side of the wrapping for the next item. The heated side bar coincidentally also serves as a cutting mechanism to separate the first wrapped item from the next "envelope" which will soon include another item formed from the next portion of flat sheeting that has been dispensed. To remove the air and form a tight wrapping around the item, the wrapped item can then be fed through a heated tunnel or shrink tunnel having a heat pump. The heat pump causes the shrink film to shrink or re-orient and thereby driving the air out from between the wrapping and the item through perforations or vent holes in the wrapping. The perforations in the wrapping can be created in many different ways as will be further discussed below.

The second form of shrink-wrap film as previously mentioned typically comes on a center-folded roll of film. In other words, the film on the roll is pre-folded in half. This folded film on a roll is typically used on an "L" sealer machine or an automatic "L" sealer with side sealer machine. An L sealer where items are inserted manually can typically wrap 15 to 20 items per minute while an L sealer with an automatic inserter could possibly wrap up to 40 items per minute. Another variation of L sealer with side sealer in an automated form can wrap up to 60 items per minute. In any event, the center folded roll of film is placed on a dispenser and fed through either side of a separator table. The dispenser (in either an FFS machine or L Sealer machine) will typically utilize a shaft and brackets on either side of the roll or alternatively a cradle with rollers where the roll of film is placed. The item is placed on either side of the separator table (either above or below the separator table) and between the folded roll of film. The "L" sealer bar which is a heated reverse "L" shaped bar (having already created a top side seal on the prior item) further serves to seal the prior item on two other sides and to form the top side seal on the next item. The L sealer bar only needs to create seals on three sides since the folded portion completes the sealed wrapping on a fourth side. The resultant trim seal from an L sealer can be evident on 3 adjacent sides of a rectangular object with the fourth adjacent side typically formed from the pre-folded film area.

The lap seal formed on an item from an FFS machine is easier to open than a trim seal from an L sealer machine. If an owner of an L sealer wraps for example cookies, muffins, or other non-rigid products with a trim sealed wrapping, it is very likely that the non-rigid product will crumble when trying to open the wrapping. A lap sealed wrapping would certainly reduce the chances of crumbling the non-rigid contents. Unfortunately, there is currently no way to form a lap seal on an L sealer machine using the center folded roll of film currently available. Thus, a need exists for a method of providing a lap seal using an L sealer machine. Furthermore, a need exists for a modified roll of film that will allow existing L sealer machines, other customized L sealer machines, or possibly other types of sealer machines to provide a lap seal on a shrink-wrapped item.

SUMMARY

In a first aspect of the present invention, folded film used to create a lap seal using an L sealer comprises a first film folded substantially in a form of a "J" and a second film overlapping at least a portion of the first film, wherein the first film and the second film are coupled together in at least a portion of an overlapping area.

In a second aspect of the present invention, a method of forming film used to create a lap seal comprises the steps of providing a first film, applying a second film to overlap at least a portion of the first film, and coupling the first film to the second film in at least a portion of an overlapping area of said first and second films.

In a third aspect of the present invention, a method of shrink wrapping an item to form a lap seal using an "L" sealer machine comprises the steps of dispensing pre-folded film having a pre-existing lap seal on the pre-folded film onto a separator table of the L sealer machine, inserting an item between the separator table and a first side of the pre-folded film, and sealing the item on at least two sides using a substantially L-shaped heated bar forming a substantially wrapped item.

In a fourth aspect of the present invention, a method of forming film used to create at least one lap seal comprises the steps of providing at least a first film, applying a subsequent film to overlap at least a portion of the first film, and coupling the first film to the subsequent film in at least a portion of an overlapping area of said first and subsequent films.

BRIEF DESCRIPTION OF THE DRAWINGS

FIG. 1 is a first sheet of film and a second sheet of film in accordance with the present invention.

FIG. 2 is the first and second film sheets coupled together with a lap seal in accordance with the present invention.

FIG. 3 is a side view of a folded film illustrating the lap seal in accordance with the present invention.

FIG. 4 is a roll of folded film placed in a cradle in accordance with the present invention.

FIG. 5 is a side cut-view of folded film dispensed onto opposing sides of a separator table of an L sealer in accordance with the present invention.

FIG. 6 is the side cut-view of FIG. 5, further illustrating an inserted item on the separator table in accordance with the present invention.

FIG. 10 is a perspective view illustrating an item wrapped using an L sealing and having a lap seal.

FIG. 11 is a side cut-view of an alternative arrangement to FIG. 6 illustrating an overlapping area within a "J" fold in accordance with the present invention.

FIG. 12 is a side cut-view of an alternative arrangement to FIG. 6 illustrating an overlapping area outside of the "J" fold where the item is placed below the separator table rather than above as shown in FIG. 6, all in accordance with the present invention.

FIG. 13 is a perspective view of a first, second, and subsequent sheets of overlapping film that could be used in an FFS machine to create dual lap seals in accordance with another aspect of the present invention.

FIG. 14 is a perspective view of the overlapping sheets of film in a roll in accordance with the present invention.

FIG. 15, is a side view of the roll of FIG. 14 illustrating micro-perforations in accordance with the present invention.

FIG. 16 is a flow chart illustrating a method of sealing a package utilizing a lap seal in accordance with the present invention.

FIG. 17 is a flow chart illustrating another method of sealing a package utilizing a lap seal in accordance with the present invention.

DETAILED DESCRIPTION OF THE DRAWINGS

Figure 7:
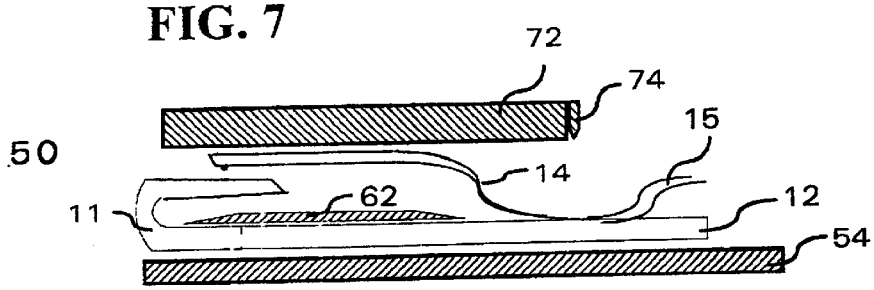
FIG. 7 is the side cut-view of FIG. 8, further illustrating an "L" bar in accordance with the present invention.

Referring to FIGS. 1, 2, and 3 there is shown a first film 12 and a second film 14 used to make a folded film 10 that enables the creation of a lap seal using an L-Sealer in accordance with the present invention. The first and second films are preferably made from polyolefin, polyvinylchloride, polypropylene, or any combination thereof, but it is certainly not limited to such materials. As shown, the first film 12 and the second film 14 are coupled together in at least a portion of an overlapping area 16. The overlapping area forms the easy opening "lap seal" which is commonly seen when using an FFS machines, but not known with L-Sealers. There are many ways in which the first and second film portions can be coupled within contemplation of the present invention, but preferably static points can be used to couple the films as well as create perforations 17 as shown in FIG. 2. The perforations allow air to escape between the wrapping and the item being wrapped as previously explained. It should be noted that the first and second film portion could also be coupled using a drag wire, hot melt, or other well-known means for coupling films. Optionally, as shown in FIG. 1 (and FIG. 10), printing 13 could be placed on the overlapped area to notify consumers of wrapped products utilizing the present invention. For example, the lap seal area could indicate "OPEN HERE" as shown. The printing is preferably done before coupling of the first and second films or before wrapping, but could alternatively be done after wrapping if necessary. As shown in FIG. 3, the first film 12 is folded substantially in the form of a "J" and the second film 14 overlaps at least a portion of the first film in the overlap area 16. The folded film 10 (including first and second films 12 and 14) is then preferably rolled onto a tubular core 36 to form a roll of film 30. On opposing distal ends or sides of the core 36, chucks 32 and 34 are placed within the hole 33 of the core 36 as shown in FIGS. 3 and 4. When the folded film with the overlapping area is rolled onto the roll, a bulge 38 will likely form which may create some problems in some dispensing arrangements. In one embodiment, the core chucks 32 and 34 preferably have larger diameters than the folded roll of film on the roll so that the roll will easily dispense without interfering with a dispensing cradle 40 having the rollers 42 and 44 as shown in FIG. 4.

Figure 8:
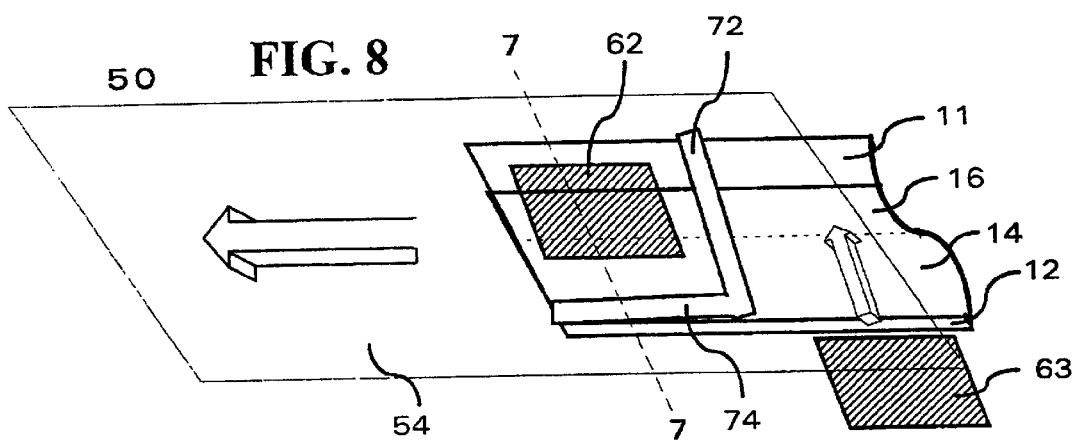
FIG. 8 is a top perspective view of the folded film with the item therein being sealed with the "L" bar of the L sealer as the next item is inserted in the next folded film portion in accordance with the present invention.
Figure 9:
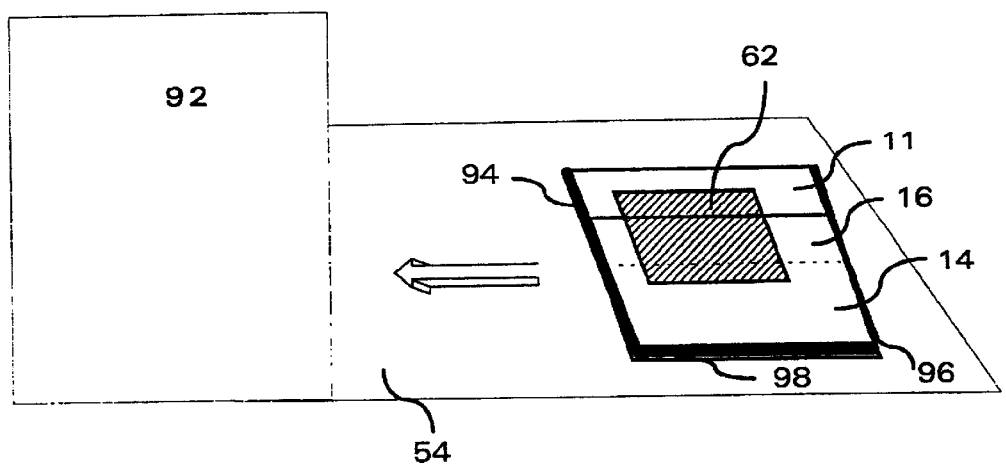
FIG. 9 is an illustration showing the wrapped item being fed into a heat or shrink tunnel in accordance with the present invention.

Referring to FIGS. 5–10, there are shown various cut views, side views, and perspective views illustrating how a product could be wrapped in accordance with the present invention using an L-Sealer device 50 on a work surface 54. FIG. 5 is a side cut view of a dispensed roll of folded film where a separator table 52 separates the rear or bottom portion of the folded film from the front or top portion of the folded film. FIGS. 5 and 6 illustrate the perforation 17 and the junction 19 where the first and second films are coupled. The rear portion of the folded film is made from a substantial portion of the first film 12. The front portion of the folded film is made from the remaining portion of the first film 12 on the topside of the bend or fold 11 and the second film 14. Referring to FIG. 6, the separator table separates the front and rear portions of the folded film to allow the easy insertion of a product 62 between the fold of the folded film. Once the product 62 is in place, the separator table 52 can be removed as is illustrated in FIG. 7. Referring to FIGS. 7, 8, and 9, a heated "reverse" shaped "L" bar formed from a first heated bar 72 (running perpendicular with the open ended portion of the folded film) and a second heated bar 74 (running parallel with the open ended portion of the folded film) is applied to the folded film. The "L" shaped bar when applied to the folded film forms a "trim seal" around a right side 96 and a bottom side 98 of the product. It should be noted that the left side 94 of the product would have been trim sealed in a prior operation of the heated "L" shaped bar. Further illustrating this point, the first heated bar 72 would form the right trim seal for the product 62 and concurrently also form the left trim seal for the subsequent product 63 to be inserted and sealed. In some instances, there may be some excess material 15 that may get removed after the trim seal process. As shown in FIG. 8, the products 62 and 63 are inserted perpendicularly into the opening of the folded film as the folded film progresses towards the left across the work surface 54. As shown in FIG. 9, the product 62 is now trim sealed on 3 sides of the product, namely the left side 94, bottom side 98 and right side 96. The product 62 at this point also includes a lap seal formed from the overlapping portion 16. The wrapped product shown in FIG. 9 is then preferably moved in a shrink wrapping system 90 by conveyor to a conventional heat tunnel or shrink tunnel 92 to shrink the plastic sheeting and thereby force the air between the wrapping and the product itself out of perforations or vent holes in the sheeting. Thus, the end result as shown in FIG. 10 is a product such as a VCR tape or other rectangular shaped product that is wrapped having a trim seal on three sides (94, 96, and 98) and lap sealed on another surface in an overlapping area 16 where the first film overlapped the second film. Although this invention has been described with a particular embodiment, it should be noted that other arrangements could be made within contemplation of the present invention. For example, it should be understood that the present invention is not limited to use with rectangular shaped products, but can specifically be used with irregularly shaped items and is particularly useful for wrapping items that are susceptible to crumbling or deformation. Further, it should be understood that the "J" fold of the first film could be closer to a "U" fold that is off center slightly with an additional small second film that overlaps. Or, if problems occur during the insertion of the product due to products interfering with the overlapping area, several alternatives could be used to overcome such problems. As shown in FIG. 11, a folded film 110 could have the "J" folded first film 12 fold over the second film 14 as opposed to the "J" folded first film being folded under as shown in FIGS. 5 and 12. In yet another alternative as shown in FIG. 12, the product 62 could be placed under the separator table 52 in order to avoid any interference between the product 16 and the overlapping area 16.

In yet another embodiment incorporating the concepts of the present invention, film portions 132, 134, 136 and 138 (etc.) are coupled together in corresponding overlapping areas 133, 135, and 137 (etc.) forming an extended roll of film 130 as shown in FIG. 13. This extended roll of film 130 can be rolled (with or without folding) on a roll 140 around a core 144. The roll 140 could have core chucks 141 and 142 on opposing ends of a core hole 143 of the core 144. Film rolled in this manner would tend to have a bulge area 146 that traverses the entire height of the roll as shown in FIGS. 14 and 15. Roll 140 could be pre-perforated with a plurality of micro-perforations 147 if desired. A roll such as roll 140 could be used on an L-Sealer as explained before if the roll 140 is center folded. The lap seal in this instance would be perpendicular in position to the lap seal of FIGS. 1–12. If the roll 140 is not center folded, then the roll 140 could actually be used in an FFS machine to form a dual lap sealed wrapping for a product if desired. Alternatively, the roll 140 used with an FFS machine could form a lap seal on one side and a static seal on an opposing side of a product (if no overlapping is done on the statically seal side).

Referring to FIG. 16, a flow chart illustrating a method 150 of forming film used to create a lap seal, comprises the step 152 of providing a first film, the step 154 of applying a second film to overlap at least a portion of the first film, and the step 156 of coupling the first film to the second film in at least a portion of an overlapping area of the first and second films. The coupling step can be achieved using a drag wire, hot melt, static points, or some other known coupling means. Preferably, the method further includes the step 158 of creating at least one perforation in at least one of the first or second films. Ideally, the step of coupling concurrently creates at least one perforation in at least one of the first or second films to allow air to escape between a product and film wrapped around the product once the wrapped product is place in a heat tunnel for example. Perforations could also be made during the dispensing process or alternatively perforations (such as micro-perforations) can already form a part of the first or second film or both. The method may optionally include the step 160 of folding the coupled first and second films substantially in the center to provided folded film. Then, the folded film may be rolled onto a tubular core to form a roll of folded film at step 162. The method 150 may further comprise the optional step 164 of printing onto the overlapping area.

Referring to FIG. 17, another flow chart is shown illustrating a method 170 of shrink wrapping an item to form a lap seal using an "L" sealer machine. The method 170 preferably comprises the steps of dispensing pre-folded film having a pre-existing lap seal on the pre-folded film onto a separator table of the L sealer machine at step 171, inserting an item between the separator table and a first side of the pre-folded film at step 174, and sealing the item on at least two sides using a substantially L-shaped heated bar forming a substantially wrapped item at step 176. The method 170 may optionally include the step 172 of perforating the pre-folded film as the pre-folded film is being dispensed. Alternatively, the pre-folded film can be pre-perforated. The method 170 may further include the step 178 of heating the substantially wrapped item to shrink the film and thereby remove a substantial portion of air between the pre-folded film and the item via perforations in the film.

Referring to FIG. 16 again, a method of forming film used to create at least one lap seal comprises providing at least a first film, applying a subsequent film to overlap at least a portion of the first film, and coupling the first film to the subsequent film in at least a portion of an overlapping area of said first and subsequent films. As shown in FIG. 13, the method may further comprise the step of repetitively overlapping additional films to a previous film and repetitively coupling such additional films to the previous film to form a roll of overlapping film. The roll of overlapping film can have a plurality of film portions of substantially the same dimensions.

The description above is intended by way of example only and is not intended to limit the present invention in any way except as set forth in the following claims.

What is claimed is:

1. Folded film used to create a package having a lap seal using an L sealer, comprising:

a first film folded substantially in a form of a "J"; and a second film overlapping at least a portion of the first film, wherein the first film and the second film are coupled together in at least a portion of an overlapping area and the first film and second film are rolled onto a core to form a roll of folded film used to make the package.

2. The folded film of claim 1, wherein the first film and second film are rolled onto a tubular core to form the roll of folded film.

3. The folded film of claim 2, wherein the roll of film further comprises core chucks on opposing sides of the tubular core.

4. The folded film of claim 2, wherein the roll of film has a diameter that is smaller than a diameter of the core chucks.

5. The folded film of claim 1, wherein at least one of the first film or the second film further comprises at least one perforation.

6. The folded film of claim 1, wherein the portion of the overlapping area comprises a plurality of perforations.

7. The folded film of claim 1, wherein the overlapping area further comprises printing.

8. The folded film of claim 1, wherein the first and second films are made from materials selected from the group comprising polyolefin, polyvinylchloride, polypropylene, or any combination thereof.

9. A method of forming film used to create a lap seal, comprising the steps of:

providing a first film substantially in a form of a "J";

applying a second film to overlap at least a portion of the first film;

coupling the first film to the second film in at least a portion of an overlapping area of said first and second films;

substantially center folding the coupled first and second films to form folded film; and rolling the folded film onto a core.

10. The method of claim 9, wherein the step of coupling further comprises the step of creating at least one perforation in at least one of the first or second films.

11. The method of claim 9, wherein the step of coupling comprises a step selected among the steps in the group comprising coupling using a drag wire, coupling using hot melt, or coupling using static points.

12. The method of claim 9, wherein the method further comprises rolling the folded film onto a tubular core to form a roll of folded film.

13. The method of claim 9, wherein the method further comprises the step of printing onto the overlapping area.

14. A method of shrink wrapping an item having a lap seal using an "L" sealer machine, comprising the steps of:

dispensing pre-folded film having a pre-existing lap seal on the pre-folded film from a core onto a separator table of the L sealer machine, wherein the pre-folded film is formed from a first film folded substantially in a form of a "J" and a second film overlapping at least a portion of the first film;

inserting an item between the separator table and a first side of the pre-folded film; and sealing the item on at least two sides using a substantially L-shaped heated bar forming a substantially wrapped item.

15. The method of claim 14, wherein the step of dispensing further comprises the step of perforating the pre-folded film as the pre-folded film is being dispensed.

16. The method of claim 14, wherein the pre-folded film is already pre-perforated.

17. The method of claim 14, wherein the method further comprises the step of heating the substantially wrapped item to force a substantial portion of air between the pre-folded film and the item out of at least one perforation in the pre-folded film.

* * * * *